(12) United States Patent
Molloy

(10) Patent No.: US 6,752,193 B1
(45) Date of Patent: Jun. 22, 2004

(54) RETRACTABLE AWNING

(76) Inventor: Michael J. Molloy, 13923 Darlene Ave., Hudson, FL (US) 34667

( * ) Notice: Subject to any disclaimer, the term of this patent is extended or adjusted under 35 U.S.C. 154(b) by 0 days.

(21) Appl. No.: 10/342,470

(22) Filed: Jan. 14, 2003

(51) Int. Cl.$^7$ ............................................... E04F 10/06
(52) U.S. Cl. ........................................ 160/67; 160/310
(58) Field of Search ............................ 160/67, 66, 68, 160/65, 310, 311; 135/88.11, 88.12

(56) References Cited

U.S. PATENT DOCUMENTS

| | | | | |
|---|---|---|---|---|
| 3,779,302 A | * | 12/1973 | Akers et al. .................. | 160/68 |
| 4,478,268 A | * | 10/1984 | Palmer ........................ | 160/310 |
| 4,834,160 A | * | 5/1989 | Becker ......................... | 160/66 |
| 4,862,940 A | * | 9/1989 | Atchison ...................... | 160/67 |
| 5,207,255 A | * | 5/1993 | Shannon ....................... | 160/65 |
| 5,232,036 A | * | 8/1993 | Brutsaert ...................... | 160/70 |
| 5,921,305 A | * | 7/1999 | Grudl ........................... | 160/66 |
| 6,021,835 A | * | 2/2000 | Malott ......................... | 160/67 |
| 6,056,350 A | * | 5/2000 | Brutsaert .................. | 160/70 X |

* cited by examiner

*Primary Examiner*—David Purol

(57) ABSTRACT

A novel device to provide protection from the elements adjacent to a vehicle using a flexible material supported by a pair of arms to create an awning. The flexible material is mounted to a roller and may be wound around the roller. The support arms are mounted to a vehicle on a pivot and will swing according to the length of the unwound flexible material. Two alternate mechanisms are introduced by the present invention for causing said roller to rotate. Also introduced by the present invention is a stabilizer arm that will provide the present invention with sufficient support to withstand strong winds.

19 Claims, 5 Drawing Sheets

RETRACTABLE AWNING

BACKGROUND OF THE INVENTION

1. Field of the Invention

The present invention relates to a device designed to provide an awning that may be retracted to a collapsed unit that will occupy minimal space and be suited for mounting on a vehicle such as a truck or recreation vehicle.

2. Description of the Prior Art

Awnings are one of the most common fixtures provided for protection against the elements. The typical design is a frame that extends laterally from a wall. The frame supports a sheet made of materials such as cloth, plastic, or nylon. The framed sheet acts as a barrier protecting any person or thing located below it from rain and direct sunlight. While permanent awning designs are prevalent and are well suited to stationary structures they are not appropriate for vehicles. An awning of this type attached to a vehicle would be quickly torn away due to the force created by wind resistance. Therefore an awning that is to be used with a vehicle must be retractable into a unit that may be stored against the side of the vehicle. There are a number of vehicles that would be greatly enhanced by such a unit. Delivery trucks are one example. Often delivery trucks must be loaded or unloaded while exposed to the elements. The men and women who unload these trucks need protection from the elements while performing this task. A unit that may be erected quickly prior to unloading and just as quickly retracted into a compact unit would greatly improve the conditions for these workers.

Many of the inventions that exist in the prior art to address this need comprise a roller mounted on hinged supports. The present invention combines novel aspects in its design for supports. These improvements make the frame of the awning sturdier. The mechanisms for rotating the roller introduced by the present invention are easier and more reliable then the existing devices. This improvement will make the present invention a much more efficient device then those taught by the prior art.

U.S. Pat. No. 3,397,006 to Donald R. Grant discloses an extension structure for a camper. This structure comprises a support design for the frame of the awning that uses two arms that mount a roller at the top. These arms do not have any additional support provided to hold them in place. This will place unnecessary weight on the cloth awning that will reduce the lifetime of the awning. The added supports provided in this design are vertical drop downs that extend from the end of the supports to the ground. These will create inconvenient obstructions that will interfere with the unloading of trucks. The rollup mechanism of the Grant '006 patent uses a chain driven axle that is cranked by the installer at the lower end of the support. This will greatly increase the weight of the supports and creates a risk of mechanical failure that may occur if the chain is knocked of track or if the cogwheels fail due to wear and tear.

U.S. Pat. No. 3,612,145 to Andrew J. Darula is another design for a rollup awning that may be used with a travel trailer. The support arms for this device consist of telescoping rods whose length will adjust according to the position of the awning cover. As with the Grant '006 patent these arms do not have any additional support provided to hold them in place. This will place unnecessary weight on the cloth awning that will reduce the lifetime of the awning. The rollup mechanism of the Darula '145 patent incorporates a hexagonal end piece at the end of the roller. A wrench is provided to enable the installer to rotate the roller by engaging the wrench with the end piece. This is awkward since turning the wrench requires a wide circular motion and the wrench can be easily disengaged.

U.S. Pat. No. 3,722,571 to John D. Knight describes an awning that may be self-stored. As with the Grant '006 and Darula '145 patents, these arms do not have any additional support provided to hold them in place. This will place unnecessary weight on the cloth awning that will reduce the lifetime of the awning. The rollup mechanism of the Knight '571 patent incorporates a roller that is affixed to the wall. A rope that is wrapped around a cogwheel rotates this roller. This design poses several problems. The rope can become entangled which would block the rolling mechanism. The rope will wear with use and eventually break. Finally the rope is permanently affixed and will not be suited for vehicles since it will vibrate under wind resistance.

U.S. Pat. No. 4,576,192 to Henry J. Duda is am awning assembly that is designed for travel trailers and mobile homes. Like the earlier described patents the present invention uses a pair of support arms that swing away from the wall of the v vehicle and hold the end of an awning. The only additional support provided in this invention is a pair of supports that extend along the side of the awning and provide attachments to maintain the desired form of the awning. This will not provide the level of support that is introduced in the support system described by the present invention. The rollup mechanism of the Duda '192 patent is a spring-loaded roller that will automatically retract when released. This design will present greater opportunity for mechanical failure as the spring is used repeatedly. It also does not allow for the flexibility that the manual mechanism of the present invention provides.

U.S. Pat. No. D449,116 to Charles Randall Sullivan is a design patent for awnings that may be mounted adjacent to mobile homes. The disclosure in this patent is for a particular sports logo design on the top of awnings. This is not related to the novelty introduced by the present invention.

Therefore a need exists for a novel and enhanced method for supporting an awning so to that it will be easily retracted in an efficient manner. This need includes a durable rotation mechanism and a sturdy support. In this respect the retractable awning according to the present invention substantially departs from the conventional concepts and designs of the prior art, and in doing so provides an apparatus primarily developed for the purpose of providing retractable awnings.

SUMMARY OF THE INVENTION

In view of the foregoing disadvantages inherent in the known types of awnings now present in the prior art, the present invention provides an improved combination of stability and effortless installation, and overcomes the abovementioned disadvantages and drawbacks of the prior art. As such, the general purpose of the present invention, which will be described subsequently in greater detail, is to provide a new and improved retractable awning which has all of the advantages of the prior art mentioned heretofore and many novel features that result in a retractable awning which is not anticipated, rendered obvious, suggested, or even implied by the prior art, either alone or in combination thereof.

In furtherance of this objective, retractable awning comprises a pair of support arms attached at the bottom end by a hinge to a wall. Mounted on the ends of these support arms is a roller that is held so that it may be moved in a rotational motion. Attached to the roller is a rectangular section of material. One side of the material is attached to the roller while the other side of the material is attached to the wall. Attached to the end of the roller is a chain link. Provided with the present invention is a rotating tool comprising a hooked end and a rectangular indentation in the middle. The hook of the tool may be looped through the link at the end of the roller and used to rotate the roller.

There has been outlined, rather broadly, the more important features of the invention in order that the detailed description thereof that follows may be better understood and in order that the present contribution to the art may be better appreciated.

The present invention may in addition comprise an alternate design whereby a roller is attached to the wall and attached to this roller is the rectangular section of material. The opposite end of the material is attached to a rod that connects the ends of the pair of supports. The roller is attached to a chain driven sprocket. The chain that is engaged with this sprocket is driven by a motor to rotate the roller.

In order to ensure that the support arms will drop to the appropriate position as the awning is unrolled, each support arm is attached to a counter weight. The counter weight being mounted at the upper end of the support arm.

An additional aspect of the retractable awning is a stabilizer rod. One end of the rod is attached to the wall by a hinge. The other end of the stabilizer rod comprises a support to be engaged with the midpoint of a support arm.

In order to secure the support arms of the present invention a bracket is mounted on the wall. The bracket defines a retainer space that will accept a support arm. Attached to the bracket is a bracket closure so that a support arm will be held within the bracket when the bracket closure is engaged.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved retractable awning that has all of the advantages of the prior art and none of the disadvantages.

It is another object of the present invention to provide a new and improved retractable awning that may be easily and efficiently manufactured and marketed.

An even further object of the present invention is to provide a new and improved retractable awning that has a low cost of manufacture with regard to both materials and labor, and which accordingly is then susceptible of low prices of sale to the consuming public, thereby making such improved rail mounted fishing pole holder economically available to the buying public.

Still another object of the present invention is to provide a new retractable awning that provides in the apparatuses and methods of the prior art some of the advantages thereof, while simultaneously overcoming some of the disadvantages normally associated therewith.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof Such description makes reference to the annexed drawings wherein.

The same reference numerals refer to the same parts throughout the various figures.

DESCRIPTION OF THE PREFERRED EMBODIMENT

Figure 1:
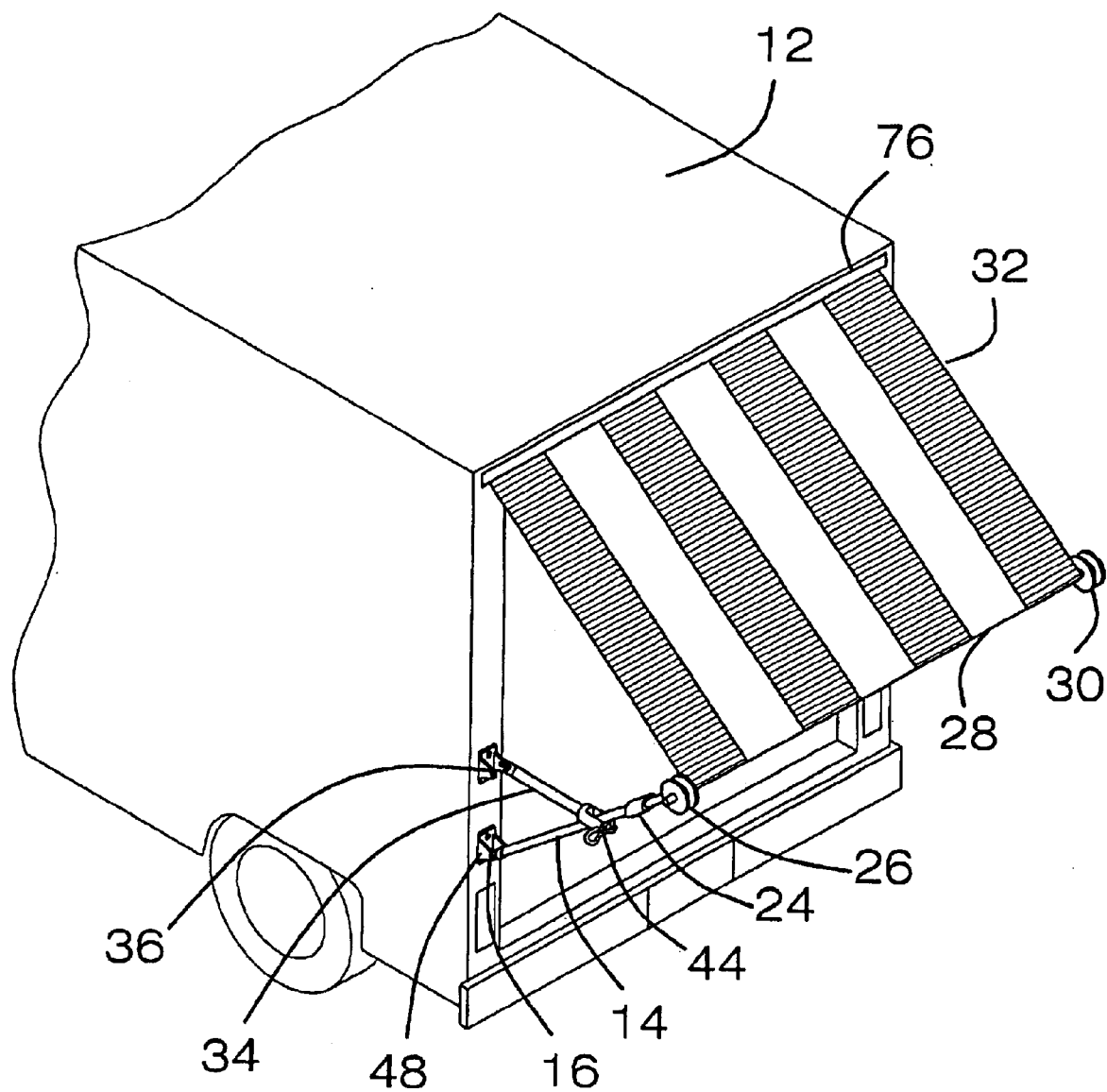
FIG. 1 is a top perspective view of the preferred embodiment of the retractable awning of the present invention in an open position.

Referring now to the drawings, and particularly to FIGS. 1–5, a preferred embodiment of the retractable awning of the present invention is shown and generally designated by the reference numeral 10.

In FIG. 1, the present invention 10 is illustrated in an open position. The illustration is of the present invention mounted to a truck 12. However the same invention could be used with any wall. The retractable awning comprises a pair of cylindrical support arms 14. A hinge 16 to the rear wall of a truck mounts one end of the support rod 14. The support rod is molded to define a hole 18 passing through this end and an axle rod 20 passes through this hole. The ends of the axle rod 20 is mounted to a pivot bracket 22 creating the abovementioned hinge. Attached to the support arms 14 is a counterweight 24 comprising a dense material such as lead. This added weight 24 enhances the tendency of the support arms 14 to fall to the lower open position as the stack of the awning is increased. Attached to the opposite and of the arms 14 is a bearing mount 26. The support arms 14 are connected by a take-up roller 28. The take-up roller 28 is held in the bearing mounts 26. Mounted to the take-up roller 28 on either side of the bearing mount is a pair of washers 30. The present invention comprises a rectangular section of material 32. One side of the material 32 is attached to the take-up roller 28, the other side of the material 32 is attached to the wall of the truck 12. These attachments can be of many types. Snaps would be appropriate. Studs might be desirable for a permanent attachment. Some materials that would be appropriate for the rectangular section of material would be canvas, vinyl, or nylon. These materials are well suited for this device since they are lightweight, flexible, and durable enough to withstand repeated rolling and unrolling. Also illustrated in FIG. 1 is a stabilizer rod 34. The stabilizer rod 34 is mounted to the wall of the truck 12 by a hinge 36. The hinge 36 comprises a bracket 38 and an axle rod 40. The axle rod 40 passes through a hole passing through the end of the stabilizer rod 34. The stabilizer rod 34 comprises on its other end a u-shaped bracket 40. The stabilizer rod 34 may be swung upward on the hinge 36 so that the u-shaped bracket 40 may pass on top of the support arm 14. A hole 42 passes through each of the arms of the u-shaped bracket 44. A cotter pin 46 may by installed through the holes 42 to clamp the stabilizer rod to the support arm 14. Other clamping mechanisms would be appropriate as well such as straps or hooks.

Figure 2:
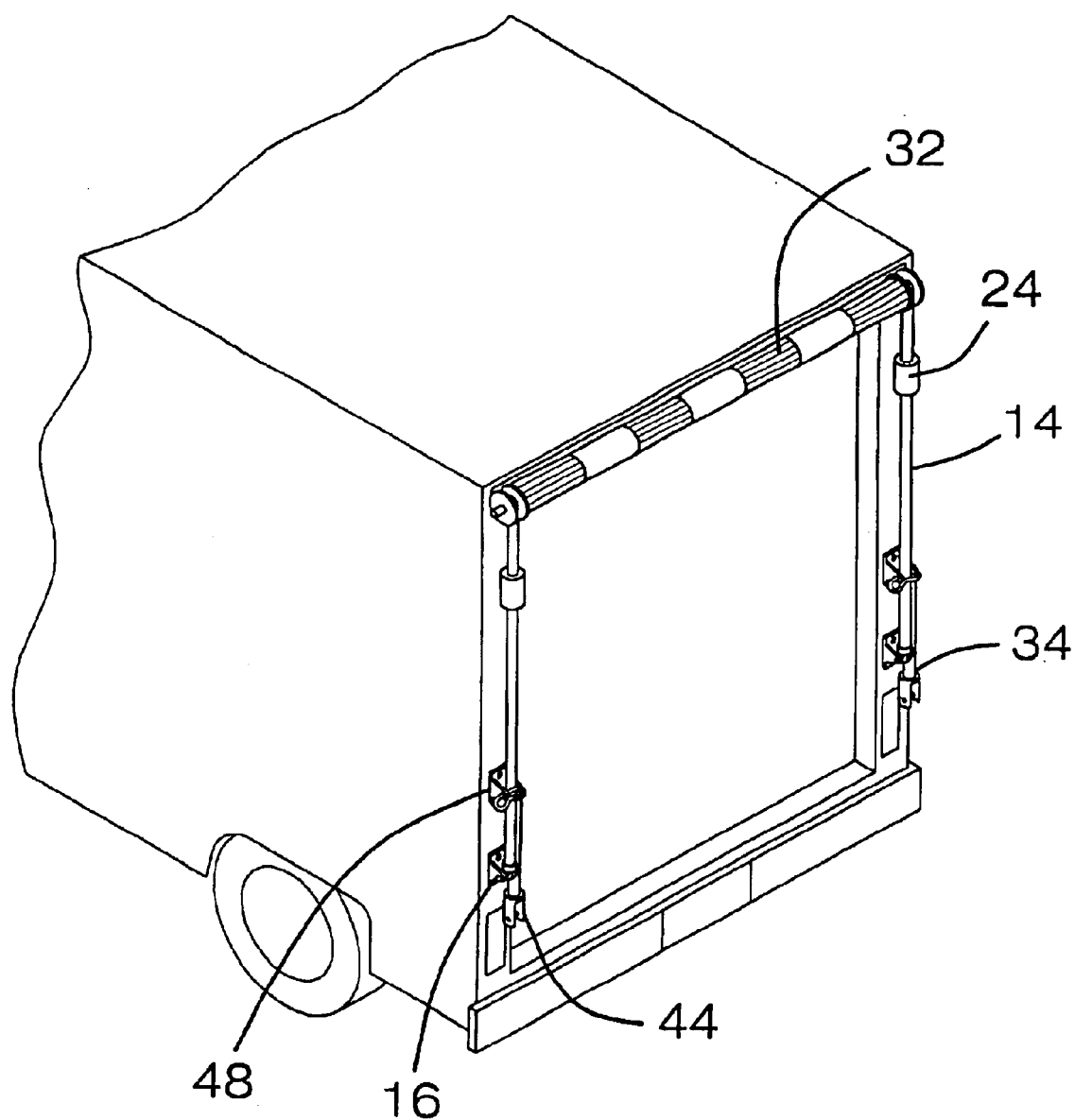
FIG. 2 is a top perspective view of the retractable awning of the present invention in a closed position.

In FIG. 2 the view illustrates the present invention 10 in a fully retracted position. The support arms 14 of the present invention are held to the wall of a truck by a retainer bracket 48. When in an upright position the support arms 14 are flush to the rear wall of the truck 12. The retainer bracket 48 comprises two sidewalls that extend beyond the support arm 14 when the support arms are retracted. Each of the sidewalls comprises a hole 50. When the support arms 14 are seated in the retainer bracket 48 a cotter pin 52 is passed through the holes 50 in the side walls and holds the support arm in place. The bottom end of the support arm 14 is attached to a pivot bracket 22 by an axle rod 20 that passes through holes 18 defined by the support arm. The support arm 14 rotates about the axle rod 20. Mounted to the support arm 14 is a counterweight that is mounted to the upper portion of the support arm. The stabilizer rod 34 is pictured in a retracted position as well. One end of the stabilizer rod 34 is mounted to the retainer bracket 48 by a pin 54 that passes through a hole defined in the end of the stabilizer rod 56. The stabilizer rod 34 rotates about the pin 54. When the present invention is retracted, the stabilizer rod 34 hangs by the pin 54 against the wall of the truck 12. At the other end of the stabilizer rod 34 is a u-shaped bracket 44. Mounted to the top of the support arms 14 is a bearing 58. The bearing 58 receives the end of the take-up roller. The bearing 58 comprises a loop that defines a bore through which passes the take-up roller 28 and allows the roller to rotate freely. On either side of the bearing is a washer 30. The washers 30 hold the take-up roller 28 in place and prevent the take-up roller from sliding out of the bearing 58. Attached to the take-up roller 28 is one side of the rectangular section of material 32. Attached to the truck 12 is the opposite side of the rectangular section of material 32. The take-up roller 28 is rotated to wrap the rectangular section of material 32 around the roller. As the material 32 is rolled up, the slack separating the opposite end and the roller 28 reduces causing the support arms 14 to swing towards the wall of the truck 12. In its fully retracted position all of the slack is taken up and the support arms 14 are flush against the truck 12. The supporter arms 14 sit inside the retaining bracket 48 with the cotter pin 52 inserted to hold the support arms in place.

Figure 3:
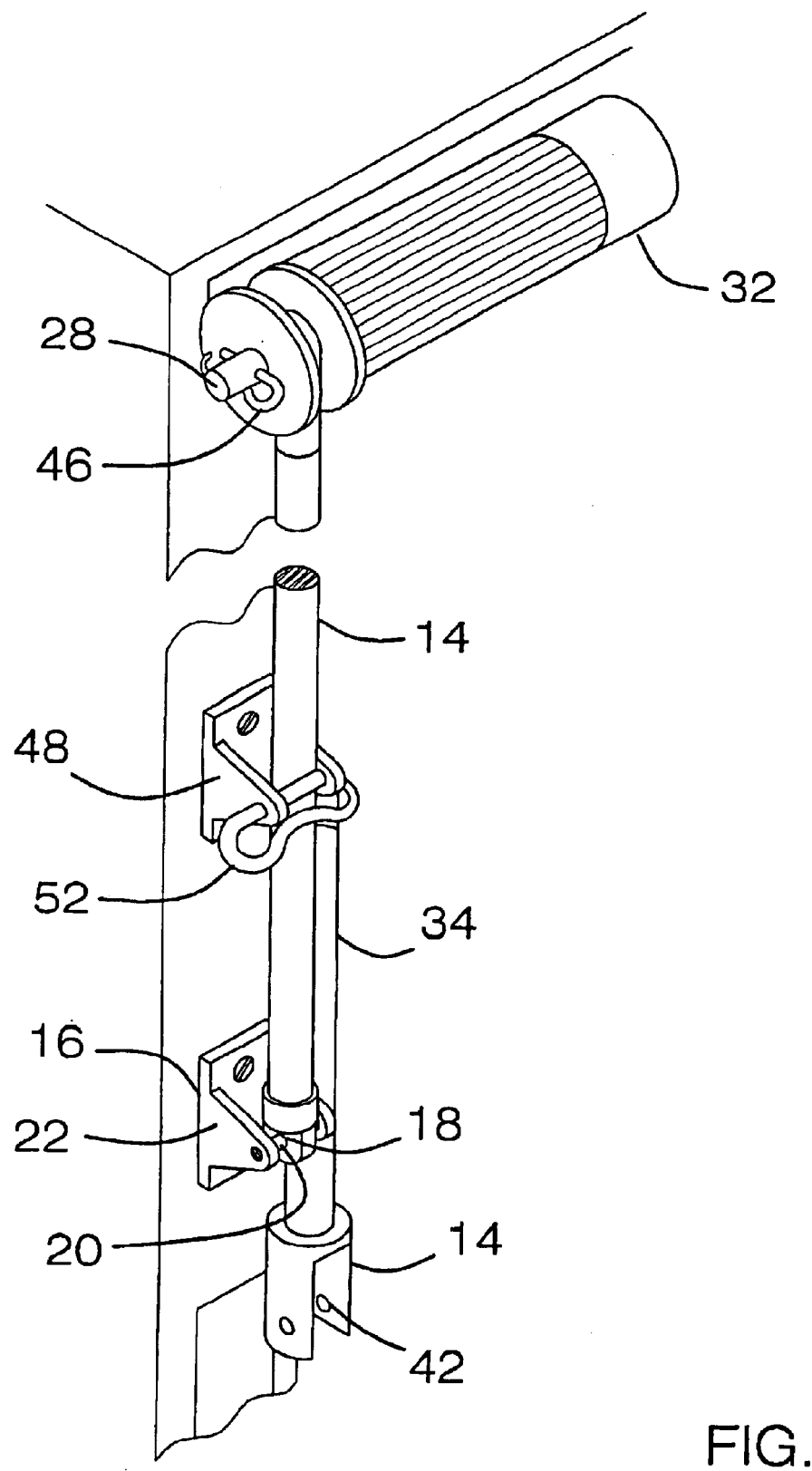
FIG. 3 is a top perspective view of the support arm of the present invention and the stabilizer rod in a retracted position.

FIG. 3 illustrates the details of the mounting hardware of the present invention and the bearing mount 26 of the present invention between the support arms 14 and the take-up roller 28. The support arm 14 is mounted at its base to the truck 12 by the pivot bracket 22. The axle rod 20 passes through the holes 18 defined by the support arm 14 and is mounted on either end to the pivot bracket 22. The support arm 14 rotates about the axle rod 20. The bracket 22 should comprise a strong easily molded material such as metal that can hold the weight of the awning. The pivot bracket 22 is formed to define a plurality of holes 58 at the base so that bolts may pass through the holes in the pivot bracket 22 and engage the wall of the truck 12. Also shown in FIG. 3 is the retainer bracket 48. The retainer bracket 48 comprises two sidewalls that extend beyond the support arm 14 when the support arm 14 is retracted. Each of the sidewalls comprises a hole 50. When the support arms 14 are seated in the retainer bracket a cotter pin 52 is passed through the holes 50 in the side walls and hold the support arm in place. Attached to the top end of the support arm 14 is a rectangular strip of metal 60 that it is formed to define a hole at either end. The strip 60 is bent to form a loop and is attached at either end to opposite sides of the support arm 14. The bent strip 60 forms a passage that acts as a bearing for the take-up roller 38. The take-up roller 38 comprises a cylindrical rod that is formed to define two holes 62 passing through the cylindrical rod at each end. The present invention comprises a pair of washers 30 mounted around the take-up roller 28 at each end. Each of the washers 30 rests on either side of the rectangular strip 60 and between the holes 62 in the take-up roller 28. A cotter pin 64 passes through each hole 62 and holds the washers 30 and rectangular metal strip 60 in place. This assembly allows for the take-up roller 28 to be held in a bearing formed by the rectangular strip 60 and held in place by the washers 30 which are in turn held in place by the cotter pins 64. Also illustrated in FIG. 3 is the stabilizer rod 34. The stabilizer rod 34 is mounted to the truck 12 at the retainer bracket 48. One end of the stabilizer rod 34 is mounted to the retainer bracket 48 by a pin 54 that passes through a hole 56 defined in the end of the stabilizer rod. The stabilizer rod 34 rotates about the pin 54. When the present invention is retracted, the stabilizer rod 34 hangs by the pin 54 against the wall of the truck 12. At the other end of the stabilizer rod 34 is a u-shaped bracket 44. The u-shaped bracket 44 is formed to define a hole through each wall of the bracket.

Figure 4:
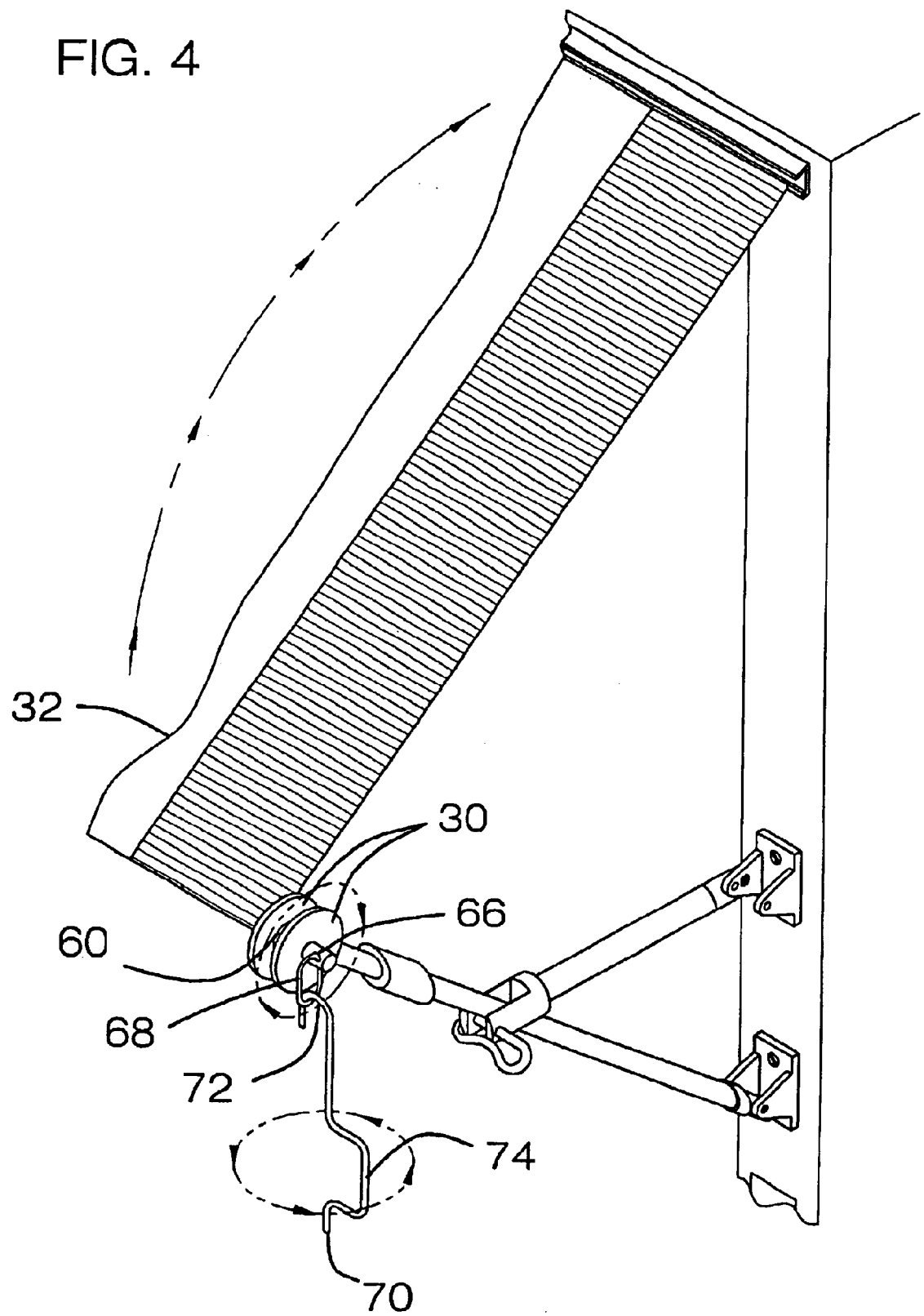
FIG. 4 is a side perspective view of the retractable awning demonstrating the manual mechanism for rolling and unrolling the awning.

FIG. 4 illustrates the method for opening the retractable awning 10 using the manual design. The present invention comprises two support arms 14 that are mounted to a wall by a pivot bracket 22. An axle rod 20 that passes through holes 18 defined by the support arm 14 is mounted on either end to the pivot bracket 22. The support arm 14 rotates about the axle rod 20. Mounted to the ends of the support arms 14 is the take-up roller 28. The bearing assembly 26 described earlier holds the take-up roller 28. The take-up roller 28 is formed to define a hole 66 at the end of the roller. A link 68 is attached to the take-up roller 28 by passing through the hole 66 in the take-up roller 28. Also included in the present invention is a hand crank 70. The hand crank comprises a long rod. The long rod is bent at one end to define a hook 72. The middle of the rod is bent to form a rectangular indentation 74. To rotate the roller 28 the installer passes the hook 72 around the link 68. The rectangular indentation 74 is then moved in the circular motion illustrated by the dotted lines around the hand crank 70. This rotation then causes the take-up roller 28 to rotate. Rotation in one-direction rolls the rectangular section of material 32 around the take-up roller 28. Rotation in the other direction unrolls the material 32. As the material 32 is rolled up, the support arms 14 are pulled to an erect position. As the material 32 is unrolled the support arms 14 fall into an open position. The dotted lines at the top of the figure illustrate the closing motion of the present invention 10. The material 32 may be mounted to the truck 12 by variety of means. The means illustrated in FIG. 4 is a rail 76 that clamps onto the material. The rail might be made of plastic or a lightweight metal such as aluminum. When the present invention is completely unrolled the stabilizer rod 34 may be lifted and placed so that the u-shaped bracket 44 passes around the stabilizer rod 34. The stabilizer rod 34 is mounted to the retainer bracket 48 on a pivot. A cotter pin is then inserted into the holes defined by side u-shaped bracket 46. The support arms 14 and stabilizer rods 34 may be made of a variety of moldable materials that will bee sturdy enough to hold the awning upright while light enough to be installed easily. A metal such as aluminum would be appropriate. Another option for this design would be wood. Plastics or metals would be good materials for the brackets.

Figure 5:
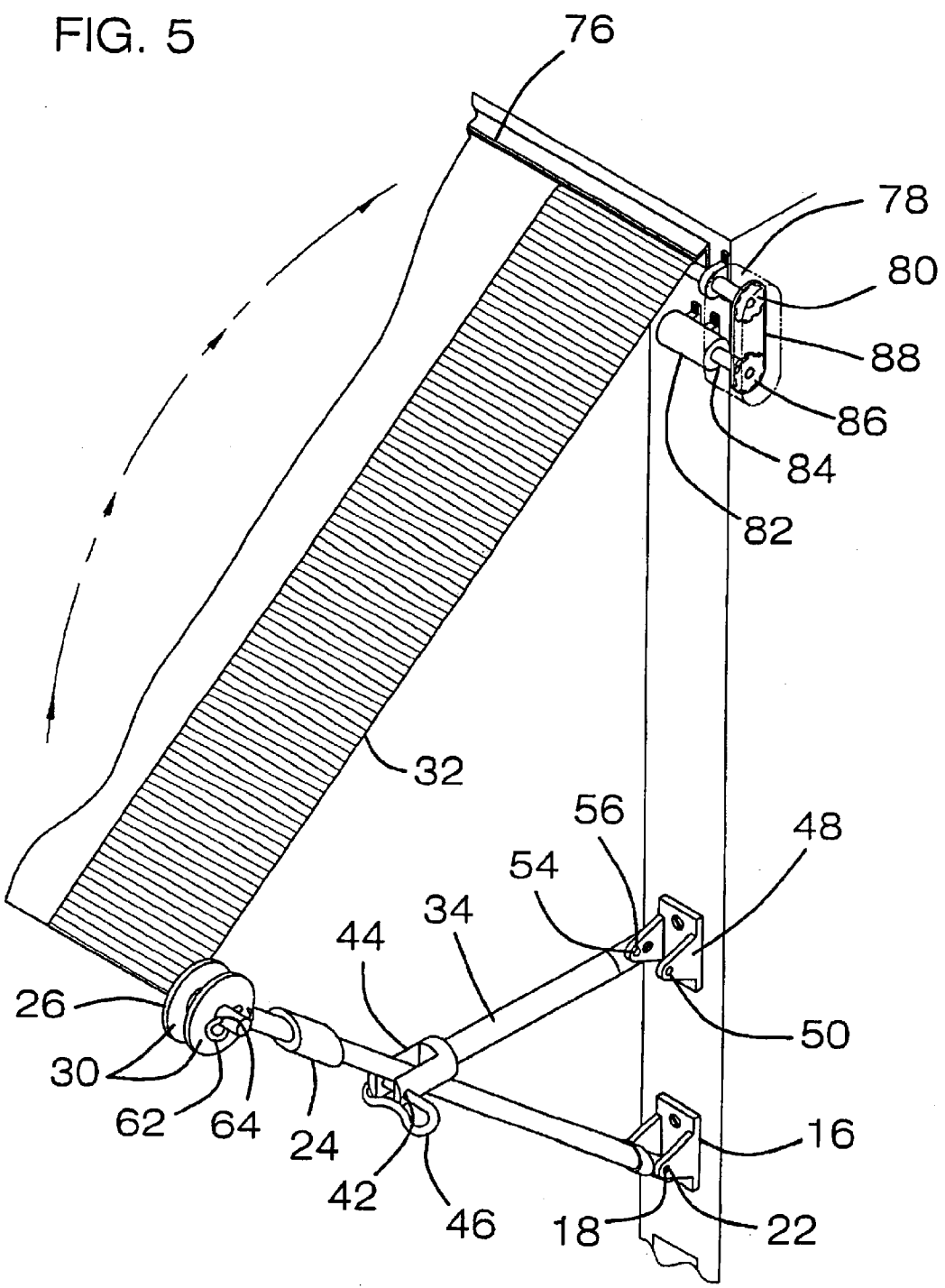
FIG. 5 is a side perspective view of the retractable awning demonstrating the motor operated mechanism for rolling and unrolling the awning.

FIG. 5 is an illustration of an alternate design for the present invention 10 that may be opened or closed by using a motor driven drive train 78. In this design the take up roller 28 is mounted to the wall of the truck 12. At the end of the take-up roller 28 is mounted a driven sprocket 80. Mounted below the take-up roller 28 is a motor 82 mounted so that the motor arm 84 extends parallel to the take-up roller 28. Attached at the end of the motor arm is a drive sprocket 86 that is held parallel to the driven sprocket 80. A Drive chain 88 passes around both of the sprockets. When the motor 82 is activated, the drive sprocket 86 will cause the chain 88 to rotate the driven sprocket 80. The rotation of the driven sprocket 80 causes the take-up roller 28 to rotate. There are two options for activation of the motor provided. This will allow the user to rotate the take-up roller 28 in either direction. The user can activate in one direction to roll up the material 32 when retracting the awning or the opposite direction to unroll the material 32 when opening the present invention. The activation may comprise a switch or a set of buttons that control the flow of AC current to the motor. The sprockets should be made of a durable material such as metal to withstand the friction of rotation. A cover should be mounted to enclose the drive train and may be made of materials such as metal or plastic.

While a preferred embodiment of the retractable awning 10 has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention. For example, any suitable lightweight metal may be used instead of the aluminum that has been described. And although the mounting of awnings to trucks has been described, there are slight variations, such as shape and size that would make the invention appropriate for other vehicles or stationary walls.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A retractable awning comprising:
   a pair of spaced apart support arms each comprising a first end pivotally secured to a vehicle;
   two mounts each of which is mounted to the second end of said support arms;
   a roller rotatably supported between said mounts wherein at least one end of said roller extends beyond one of said mounts and wherein said end of said roller is formed to define a passage;
   a flexible covering comprising one end thereof secured to said roller to be wound thereon and wherein said covering further comprises a second end removably attached to said vehicle;
   an elliptical member wherein said elliptical member passes through said passage defined in said roller
   a rod one end of which is bent to form a hook and wherein a midpoint is bent to form a rectangular indentation and wherein said hook may be engaged around said elliptical member.

2. The retractable awning of claim 1 wherein said mount comprises a rectangular metal strap bent to define a bearing through which passes said roller and wherein the ends of said metal strap are attached to said second end of said support arms.

3. The retractable awning of claim 1 further comprising two pairs of washers wherein each of said washers is attached to said roller on either side of said metal strap.

4. The retractable awning of claim 1 wherein said flexible covering is removably attached to said vehicle by rivets.

5. The retractable awning of claim 1 wherein said flexible covering is removably attached to said vehicle by a set of male snap buttons attached to said flexible covering and a set of female snap button receivers mounted to said vehicle.

6. The retractable awning of claim 1 further comprising a pair of tubular members comprising dense metal wherein said support arms pass through said tubular members and are secured thereto.

7. The retractable awning of claim 1 further comprising a stabilizer rod wherein the first end of said stabilizer rod is pivotally secured to said vehicle and wherein the retractable awning further comprises a U-shaped member attached to the second end of said stabilizer rod.

8. The retractable awning of claim 7 further comprising a pair of tubular members comprising dense metal wherein said support arms pass through said tubular members and are secured thereto.

9. The retractable awning of claim 1 wherein said mount comprises a rectangular metal strap bent to define a bearing through which passes said roller and wherein the ends of said metal strap are attached to said second end of said support arms.

10. The retractable awning of claim 9 further comprising two pairs of washers wherein each of said washers is attached to said roller on either side of said metal strap.

11. The retractable awning of claim 1 wherein said flexible covering is removably attached to said vehicle by rivets.

12. The retractable awning of claim 1 wherein said flexible covering is removably attached to said vehicle by a set of male snap buttons attached to said flexible covering and a set of female snap button receivers mounted to said vehicle.

13. The retractable awning of claim 1 further comprising a stabilizer rod wherein the first end of said stabilizer rod is pivotally secured to said vehicle and wherein the retractable awning further comprises a U-shaped member attached to the second end of said stabilizer rod.

14. The retractable awning of claim 1 further comprising a pair of tubular members comprising dense metal wherein said support arms pass through said tubular members and are secured thereto.

15. The retractable awning of claim 1 comprising a pair of vehicle mounts attached to said vehicle and wherein said retractable awning further comprises a second roller rotatably mounted between said vehicle mounts and wherein a first sprocket is attached to one end of said roller and wherein said retractable awning further comprises a motor mounted to said vehicle so that the arm of said motor is parallel to said roller and wherein attached to said arm of said motor is a second sprocket aligned with said first sprocket and wherein said retractable awning further comprises a chain engaged with the teeth of said first sprocket and said second sprocket.

16. The retractable awning comprising:
 a pair of spaced apart support arms each comprising a first end pivotally secured to a vehicle;
 two support arm mounts each of which is mounted to the second end of said support arms;
 a rod supported between said mounts;
 two vehicle mounts attached to said vehicle
 a roller rotatably supported between said vehicle mounts wherein at least one end of said roller extends beyond one of said vehicle mounts;
 a first sprocket attached to said end of said roller extending beyond said vehicle mount;
 a motor comprising an arm extending therefrom, said arm mounted to said vehicle so that said arm is parallel to said roller and wherein attached to said arm of said motor is a second sprocket aligned with said first sprocket;
 a chain engaged with the teeth of said first sprocket and the teeth of said second sprocket
 a flexible covering comprising one end thereof secured to said roller to be wound thereon and wherein said covering further comprises a second end attached to said rod.

17. The retractable awning of claim 16 wherein said support arm mounts comprise a rectangular metal strap bent to define a bearing through which passes said roller and wherein the ends of said metal strap are attached to said second end of said support arms.

18. A retractable awning comprising:
 a pair of spaced apart support arms each comprising a first end pivotally secured to a vehicle;
 two mounts each of which is mounted to the second end of said support arms;
 a roller rotatably supported between said mounts wherein at least one end of said roller extends beyond one of said mounts and wherein said end of said roller is formed to define a passage;
 a flexible covering comprising one end thereof secured to said roller to be wound thereon and wherein said covering further comprises a second end removably attached to said vehicle;
 a stabilizer rod wherein the first end of said stabilizer rod is pivotally secured to said vehicle and wherein the retractable awning further comprises a U-shaped member attached to the second end of said stabilizer rod;
 a crank attached to said roller.

19. The retractable awning of claim 18 wherein said crank comprises an elliptical member passing through a hole in said roller and a rod bent at one end to form a hook and bent to comprise a rectangular indentation and wherein said hook is removably engaged with said elliptical member.

* * * * *